Figures 1, 2:
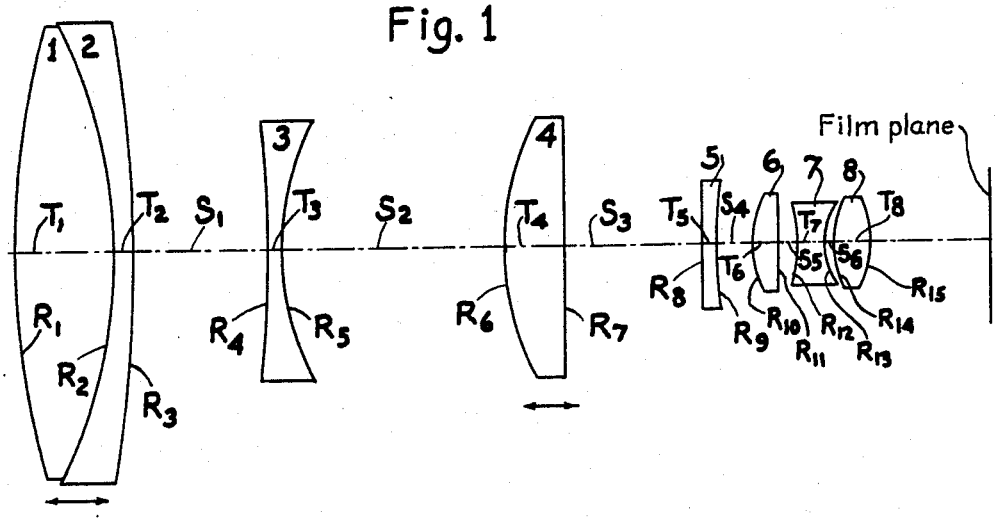

Feb. 16, 1960     E. TURULA ET AL     2,925,010

VARIABLE FOCAL LENGTH LENS

Filed Jan. 15, 1959

| EF varies, 9.72 to 30.71 mm. | | | | f:1.8 |
|---|---|---|---|---|
| Lens | $N_D$ | V | Radii, mm. | Thicknesses, mm. |
| 1 | 1.5170 | 64.5 | $R_1 = + 63.53$ | $T_1 = 8.0$ |
| 2 | 1.6170 | 36.6 | $R_2 = - 39.3$ | $T_2 = 1.58$ |
|  |  |  | $R_3 = - 110.0$ | $S_1$ varies, 1.10 to 27.50 |
| 3 | 1.6203 | 60.3 | $R_4 = - 100.0$ | $T_3 = 1.5$ |
|  |  |  | $R_5 = + 22.15$ | $S_2 = 28.65 - S_1$ |
| 4 | 1.6227 | 56.9 | $R_6 = + 21.65$ | $T_4 = 4.95$ |
|  |  |  | $R_7 = \infty$ | $S_3 = S_1$ |
| 5 | 1.6203 | 60.3 | $R_8 = \infty$ | $T_5 = 1.0$ |
|  |  |  | $R_9 = + 38.8$ | $S_4 = 3.0$ |
| 6 | 1.7445 | 45.56 | $R_{10} = + 8.5$ | $T_6 = 2.06$ |
|  |  |  | $R_{11} = -398.0$ | $S_5 = 1.5$ |
| 7 | 1.7398 | 28.16 | $R_{12} = - 11.7$ | $T_7 = 2.33$ |
|  |  |  | $R_{13} = + 5.59$ | $S_6 = 0.65$ |
| 8 | 1.6968 | 56.15 | $R_{14} = + 8.1$ | $T_8 = 2.97$ |
|  |  |  | $R_{15} = - 8.1$ |  |
|  |  |  |  | BF = 9.86 |

United States Patent Office 2,925,010
Patented Feb. 16, 1960

2,925,010

VARIABLE FOCAL LENGTH LENS

Eugene Turula and Geraldine B. Lynch, Rochester, N.Y., assignors to Wollensak Optical Company, Rochester, N.Y., a corporation of New York Application January 15, 1959, Serial No. 786,978

4 Claims. (Cl. 88—57)

This invention relates to a variable focus lens, often called a "zoom" lens, and especially to such a lens suitable for use on a motion picture camera, although useful also on still cameras and for other optical purposes.

An objection of the invention is the provision of a simple and inexpensive form of zoom lens suitable for use by experienced and inexperienced photographers alike, on various types of cameras.

Another object is the provision of what may be termed a three-position zoom lens, having one position of adjustment in which the zoom lens acts as a normal lens for the camera on which it is mounted, another position in which it acts as a wide angle lens, and a third position in which it acts as a telephoto lens.

Still another object is the provision of a simple and inexpensive form of single adjustable lens unit which will impart to the camera to which it is attached the versatility which has heretofore required three separate lenses (normal and wide-angle and telephoto), thus obviating the extra expense of separate lenses and the time required for changing separate lenses or for turning a turret on which various lenses are mounted.

A still further object is the provision of a zoom lens of sufficiently simple construction to be used on comparatively inexpensive cameras, yet having a very high degree of color correction, both lateral and longitudinal.

These and other desirable objects may be attained in the manner disclosed as an illustrative embodiment of the invention in the following description and in the accompanying drawings forming a part hereof, in which:

Fig. 1 is a diagrammatic view of a lens in accordance with a preferred embodiment of the present invention; and Fig. 2 is a table of numerical data with respect to one specific embodiment of such a lens.

Photographers, whether amateur or professional, frequently wish to be able to take pictures not only under what may be called normal lens conditions, but also under conditions making it advisable to use special lenses such as wide-angle lenses or telephoto lenses. This has usually been accomplished in the past by providing separate lenses, either detachably and interchangeable mounted, or mounted on a turret. Although some efforts have been made to produce zoom lenses suitable for use on amateur cameras, such lenses have usually been so expensive that there has been little or no saving over the cost of the conventional three separate lenses. Moreover, such lenses have not been marked or graduated in a manner to facilitate adjustment to three set or standard positions corresponding, respectively, to wide-angle, normal, and telephoto lenses. In addition, such lenses have usually had rather poor color correction.

According to the present invention, there is provided a zoom lens sufficiently simple and rugged to be suitable for amateur use, and which can be produced sufficiently inexpensively so that there is a real saving in cost as compared with the cost of the three conventional lenses (normal and wide-angle and telephoto) which the present lens replaces, and which is achromatic to a high degree, having excellent correction for both longitudinal and lateral color.

According to a preferred form of the present invention, the lens has eight separate lens elements, the first two of which constitute a cemented doublet component. The third, fourth, and fifth elements are single air spaced lenses. The sixth, seventh, and eighth elements collectively may be called the rear member. This rear member, in the preferred form, is made up of three air spaced elements which together form a corrected photographic lens of suitable focal length, but it is within the scope of the present invention to form the rear member as a simpler doublet suitably designed to compensate for the aberrations of the system preceding it.

In the following disclosure, the individual lens elements are numbered from 1 to 8, respectively from front to rear. The radii of curvature R, the axial thicknesses T of the lens elements, and the spacings S between elements, are all expressed in the customary manner, with the usual subscripts indicating the particular surface, lens thickness, or air space, numbered in sequence from front to rear. Since lenses 1 and 2 are cemented together, $R_2$ refers to both the rear surface of the lens 1 and the front surface of lens 2, and the radius of the rear face of lens 2 is designated $R_3$. The plus and minus values of the radii R indicate surfaces respectively convex and concave toward the front, in accordance with conventional notation. The respective refractive indices, expressed in reference to the spectral D line of sodium, are indicated by N, and the dispersive indices or Abbe numbers are indicated by V. The diameters of the respective lens elements are designated by D. The focal lengths of certain individual lenses are indicated by F with a subscript corresponding to the number of the particular lens element in question. The focal length of the doublet component or combination of lenses 1 and 2 is indicated by $F_c$. The focal length of the above-mentioned "rear member" (the three lenses 6, 7, and 8, in the preferred form, or the doublet rear member, in the mentioned modification) is indicated by $F_m$. A positive value of F indicates a positive or converging lens (or combination of lenses) and a negative value indicates a negative or diverging lens or combination.

According to the present invention, good results are attained when the below-indicated variable factors are within the ranges indicated by the following symbols:

$$-0.2\ \ F_c < F_3 < -0.6\ \ F_c$$
$$0.2\ \ F_c < F_4 <\ \ 0.6\ \ F_c$$
$$-0.4\ \ F_c < F_5 < -0.9\ \ F_c$$
$$0.609\ F_c < R_1 <\ \ 0.824\ F_c$$
$$-0.349\ F_c < R_2 < -0.473\ F_c$$
$$-0.978\ F_c < R_3 < -1.323\ F_c$$
$$2.931\ F_3 < R_4 <\ \ 3.966\ F_3$$
$$-0.649\ F_3 < R_5 < -0.878\ F_3$$

$$0.529 \ F_4 < R_6 < \ 0.716 \ F_4$$
$$0.150 \ F_4 < R_7 < \ \infty$$
$$-0.150 \ F_5 < R_8 < \ \infty$$
$$-0.527 \ F_5 < R_9 < -0.713 \ F_5$$

$F_c$ is approximately 7.5 $F_m$, and $F_m$ is so chosen as to cover a total angular field of not more than 30°.

A specific example of a lens whose variables fall within the above-mentioned limits and which meets all of the outlined requirements may be constructed in accordance with the numerical data given in the following table, the various symbols in the table having the meanings above explained. All dimensions in this example are given in millimeters.

| Lens | N | V | D | Radii | Thickness |
|---|---|---|---|---|---|
| 1 | 1.5170 | 64.5 | 35 | $R_1 = +63.53$ | $T_1 = 8.0$ |
|   |        |      |    | $R_2 = -39.3$  |              |
| 2 | 1.6170 | 36.6 | 35.5 | $R_3 = -110.0$ | $T_2 = 1.58$ |
|   |        |      |    |                | $S_1 = 1.10$ to 27.50 |
|   |        |      |    | $R_4 = -100.0$ | $T_3 = 1.5$ |
| 3 | 1.6203 | 60.3 | 20 | $R_5 = +22.15$ |             |
|   |        |      |    |                | $S_2 = 28.65 - S_1$ |
|   |        |      |    | $R_6 = +21.65$ |             |
| 4 | 1.6227 | 56.9 | 20 | $R_7 = \infty$ | $T_4 = 4.95$ |
|   |        |      |    |                | $S_3 = S_1$ |
|   |        |      |    | $R_8 = \infty$ |             |
| 5 | 1.6203 | 60.3 | 10 | $R_9 = +38.8$  | $T_5 = 1.0$ |
|   |        |      |    |                | $S_4 = 3.0$ |
|   |        |      |    | $R_{10} = +8.5$ |            |
| 6 | 1.7445 | 45.56 | 7.85 | $R_{11} = -398.0$ | $T_6 = 2.06$ |
|   |        |      |    |                | $S_5 = 1.5$ |
|   |        |      |    | $R_{12} = -11.7$ |           |
| 7 | 1.7398 | 28.16 | 6.4 | $R_{13} = +5.59$ | $T_7 = 2.33$ |
|   |        |      |    |                | $S_6 = 0.65$ |
|   |        |      |    | $R_{14} = +8.1$ |            |
| 8 | 1.6968 | 56.15 | 7 | $R_{15} = -8.1$ | $T_8 = 2.97$ |

In this specific example, the front component (lenses 1 and 2) and lens 4 are axially movable to vary the magnification, and all the other lenses are stationary. In all positions of adjustment, $S_2 + S_3$ is a constant, which obviously follows from the fact that lens 4 moves axially between stationary lenses 3 and 5, and this constant, in the present specific example, is 28.65 mm. Also, in this example, $S_1 = S_3$. The present specific example is designed as a universal focus lens. But without departing from the invention, the front component can be made individually movable axially for sharp focusing, independently of the other lenses and independently of the zooming motion. If this were done, then of course $S_1$ would not always be equal to $S_3$, but might be slightly more or less than $S_3$, depending upon the focusing position of the front component.

In all positions of adjustment of the axially movable elements for variable magnification or zooming effect, the back focus or BF remains constant at 9.86 mm., in the specific example above given. When the parts are adjusted for what may be called normal or intermediate magnification, $S_1$ and $S_3$ are 11.0 mm., $S_2$ is 17.65 mm., and the lens as a whole has an equivalent focal length or EF of 14.84 mm. When adjusted to wide-angle position, $S_1$ and $S_3$ are 1.10 mm., $S_2$ is 17.65 mm., and EF is 9.72 mm. When adjusted to telephoto position, $S_1$ and $S_3$ are 27.0 mm., $S_2$ is 1.15 mm., and EF is 30.71. The above-mentioned wide-angle and telephoto positions are the respective extreme positions of adjustment of the lens according to the specific example here given, which specific example is designed as a zoom lens for an 8 mm. motion picture camera. By making appropriate proportional changes which will be obvious to a skilled lens designer in the light of the present disclosure, the lens may be adapted to motion picture cameras of other sizes (e.g., 16 mm. or 35 mm. cameras) and to still cameras of various sizes.

A satisfactory location for an iris diaphragm is midway between the lens elements 5 and 6; that is, midway in the space $S_4$. In such a position, the diaphragm produces a minimum of vignetting at any focal length setting.

The focal length or EF is continuously variable between the extreme limits above mentioned, and the lens may be used satisfactorily at any intermediate position of adjustment. However, it is preferred to engrave or graduate the lens mount to show specifically the two extreme positions and one suitable intermediate or "normal" position such as the particular normal position identified above. Such graduations or markings serve to emphasize to the user, particularly if he is a relatively inexperienced person, the fact that the present lens takes the place of and is to be used for the purposes of all three of the conventional kinds of lenses (normal and wide-angle and telephoto) frequently provided on cameras, either on separate detachable mounts or on turrets. The more experienced user will quickly appreciate that he can adjust his lens to an infinite variety of intermediate positions, and can also adjust it during the course of an exposure sequence, to obtain a true zoom effect. But to the beginner, not yet ready for advanced work of this kind, the words "wide-angle" and "normal" and "telephoto," suitably marked on the barrel of the lens mount to show three definite positions of adjustment, will impart a feeling of confidence and dispel any uncertainty as to how he should adjust the parts to obtain the normal effect or wide-angle effect or telephoto effect that he may want. Thus the beginner can and should think of the present lens primarily as a three-position lens, taking the place of the three separate lenses heretofore used in conventional practice, thus obviating the confusion which frequently overtakes beginners attempting to use zoom lenses of the kinds heretofore offered for amateur use.

A lens according to the above specific example is shown diagrammatically in Fig. 1, the movable elements being illustrated in the above-identified "normal" intermediate position. The numerical data for the specific example are repeated in Fig. 2, which is a ready-reference lens chart.

Variations in the dimensions given in the above specific example are possible, but such variations should preferably be kept within the proportional limits previously mentioned.

What is claimed is:

1. A photographic objective lens of variable magnification power, comprising two lens elements cemented together to form a front doublet, and other lens elements grouped to form a rear member, and three lens elements air spaced between said front doublet and said rear member, the below-mentioned characteristics of the lens elements forwardly of said rear member being substantially within the ranges indicated by the following algebraic inequalities:

$$-0.2 \ \ F_c < F_3 < -0.6 \ \ F_c$$
$$0.2 \ \ F_c < F_4 < \ 0.6 \ \ F_c$$
$$-0.4 \ \ F_c < F_5 < -0.9 \ \ F_c$$
$$0.609 \ F_c < R_1 < \ 0.824 \ F_c$$
$$-0.349 \ F_c < R_2 < -0.473 \ F_c$$
$$-0.978 \ F_c < R_3 < -1.323 \ F_c$$
$$2.931 \ F_3 < R_4 < \ 3.966 \ F_3$$
$$-0.649 \ F_3 < R_5 < -0.878 \ F_3$$
$$0.529 \ F_4 < R_6 < \ 0.716 \ F_4$$
$$0.150 \ F_4 < R_7 < \ \infty$$
$$-0.150 \ F_5 < R_8 < \ \infty$$
$$-0.527 \ F_5 \ \ R_9 < -0.713 \ F_5$$
$$F_c = \text{approximately } 7.5 \ F_m$$

wherein $F_c$ is the focal length of the cemented doublet formed by the first two lens elements, $F_m$ is the focal length of said rear member, $F_3$ and $F_4$ and $F_5$ are respectively the focal lengths of the third, fourth, and fifth lens elements, counting from the front, and $R_1$ through $R_9$ respectively indicate the radii of curvature of the respective lens surfaces, numbered from front to rear and counting the rear surface of the first element and the front surface of the second element as a single surface whose radius is $R_2$.

2. A photographic objective lens of variable magnification power, comprising two lens elements cemented together to form a front doublet, and other lens elements grouped to form a rear member, and three lens elements air spaced between said front doublet and said rear member, the characteristics of the lens elements forwardly of said rear member and their spatial relationship to each other being substantially in the proportions indicated by the data in the following table:

| Lens | N | V | Radii, mm. | Thicknesses, mm. |
|---|---|---|---|---|
| 1 | 1.5170 | 64.5 | $R_1=+63.53$ | $T_1=8.0$ |
|   |        |      | $R_2=-39.3$  |              |
| 2 | 1.6170 | 36.6 | $R_3=-110.0$ | $T_2=1.58$ |
|   |        |      |              | $S_1=1.10$ to $27.50$ |
|   |        |      | $R_4=-100.0$ | $T_3=1.5$ |
| 3 | 1.6203 | 60.3 | $R_5=+22.15$ | $S_2=28.65-S_1$ |
|   |        |      | $R_6=+21.65$ |              |
| 4 | 1.6227 | 56.9 | $R_7=\infty$ | $T_4=4.95$ |
|   |        |      | $R_8=\infty$ | $S_3=S_1$ |
| 5 | 1.6203 | 60.3 | $R_9=+38.8$  | $T_5=1.0$ | wherein the lens elements are numbered in order from front to rear in the first column, the corresponding refractive indices N for the D line of the spectrum are given in the second column, the corresponding dispersive indices V are given in the third column, the radii of curvature R of the lens surfaces are given in the fourth column, the respective surfaces being numbered from front to rear and being respectively identified by the subscript numeral used with each R, with plus and minus values of R indicating curved surfaces which are respectively convex and concave toward the front of the lens, the axial thicknesses T of the respective lens elements and the axial thicknesses S of the air spaces between the lens elements being given in the fifth column, the respective lens element thicknesses and air spaces being separately numbered from front to rear and being respectively identified by numerical subscripts used with each T and S, the lens elements 3 and 5 being axially stationary and the lens elements 1, 2, and 4 being axially movable in unison to vary the magnification power and the equivalent focal length of the lens.

3. A photographic objective lens of variable magnification power, comprising two lens elements cemented together to form a front doublet, and six other lens elements air spaced in the rear of said doublet, the characteristics of the respective lens elements and their spatial relationship to each other being substantially in accordance with the data in the following table:

| Lens | N | V | Radii, mm. | Thicknesses, mm. |
|---|---|---|---|---|
| 1 | 1.5170 | 64.5 | $R_1=+63.53$ | $T_1=8.0$ |
|   |        |      | $R_2=-39.3$  |              |
| 2 | 1.6170 | 36.6 | $R_3=-110.0$ | $T_2=1.58$ |
|   |        |      |              | $S_1=1.10$ to $27.50$ |
|   |        |      | $R_4=-100.0$ | $T_3=1.5$ |
| 3 | 1.6203 | 60.3 | $R_5=+22.15$ | $S_2=28.65-S_1$ |
|   |        |      | $R_6=+21.65$ |              |
| 4 | 1.6227 | 56.9 | $R_7=\infty$ | $T_4=4.95$ |
|   |        |      | $R_8=\infty$ | $S_3=S_1$ |
| 5 | 1.6203 | 60.3 | $R_9=+38.8$  | $T_5=1.0$ |
|   |        |      |              | $S_4=3.0$ |
|   |        |      | $R_{10}=+8.5$  | $T_6=2.06$ |
| 6 | 1.7445 | 45.56 | $R_{11}=-398.0$ |            |
|   |        |      |              | $S_5=1.5$ |
|   |        |      | $R_{12}=-11.7$ | $T_7=2.33$ |
| 7 | 1.7398 | 28.16 | $R_{13}=+5.59$ |            |
|   |        |      |              | $S_6=0.65$ |
|   |        |      | $R_{14}=+8.1$  | $T_8=2.97$ |
| 8 | 1.6968 | 56.15 | $R_{15}=-8.1$  |            | wherein the lens elements are numbered in order from front to rear in the first column, the corresponding refactive indices N for the D line of the spectrum are given in the second column, the corresponding dispersive indices V are given in the third column, the radii of curvature R of the lens surfaces are given in the fourth column, the respective surfaces being numbered from front to rear and being respectively identified by the subscript numeral used with each R, with plus and minus values of R indicating curved surfaces which are respectively convex and concave toward the front of the lens, the axial thicknesses T of the respective lens elements and the axial thicknesses S of the air spaces between lens elements being given in the fifth column, the respective lens element thicknesses and air spaces being separately numbered from front to rear and being respectively identified by the numerical subscripts used with each T and S, the lens elements 3 and 5 to 8 inclusive being axially stationary and the lens elements 1, 2, and 4 being axially movable in unison to vary the magnification power and the equivalent focal length of the lens.

4. A lens as defined in claim 3, wherein the equivalent focal length of the lens may be varied substantially between the limits of 9.72 mm. and 30.71 mm. upon shifting the lens elements 1, 2, and 4 within the range of travel indicated in claim 3, the lens in all positions of focal length adjustment having a maximum relative aperture of substantially $f:1.8$.

References Cited in the file of this patent
UNITED STATES PATENTS

| | | |
|---|---|---|
| 2,514,239 | Hopkins | July 4, 1950 |
| 2,566,485 | Cuvillier | Sept. 4, 1951 |
| 2,649,025 | Cook | Aug. 18, 1953 |
| 2,718,817 | Back et al. | Sept. 27, 1955 |
| 2,737,082 | Dowling | Mar. 6, 1956 |
| 2,778,272 | Raymond | Jan. 22, 1957 |
| 2,843,016 | Reiss | July 15, 1958 |
| 2,847,907 | Angenieux | Aug. 19, 1958 |